（12）United States Patent  (10) Patent No.: US 7,578,180 B2
Lionetti et al.  (45) Date of Patent: Aug. 25, 2009

(54) TREAD DEPTH SENSING DEVICE AND METHOD FOR MEASURING SAME

(75) Inventors: Robert Edward Lionetti, Bereldange (LU); Anthony Williams Parsons, Dommeldange (LU); Joseph Carmine Lettieri, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 6 days.

(21) Appl. No.: 11/771,455

(22) Filed: Jun. 29, 2007

(65) Prior Publication Data

US 2009/0000370 A1    Jan. 1, 2009

(51) Int. Cl.
    *G01M 17/02*    (2006.01)
(52) U.S. Cl. ..................................................... 73/146
(58) Field of Classification Search ........ 73/146–146.8; 340/442–447
    See application file for complete search history.

(56) References Cited

U.S. PATENT DOCUMENTS

| | | | |
|---|---|---|---|
| 3,878,712 A * | 4/1975 | Chapin ........................ | 73/146 |
| 3,918,816 A | 11/1975 | Foster et al. | |
| 4,184,365 A * | 1/1980 | Webster ....................... | 73/146 |
| 4,331,030 A * | 5/1982 | Webster ....................... | 73/146 |
| 4,918,976 A | 4/1990 | Fogal, Sr. | |
| 5,088,321 A * | 2/1992 | Kajikawa et al. .............. | 73/146 |
| 5,245,867 A | 9/1993 | Sube et al. | |
| 5,801,304 A | 9/1998 | Cantu et al. | |
| 5,895,845 A | 4/1999 | Burger | |
| 5,962,779 A * | 10/1999 | Bass ........................ | 73/146.5 |
| 5,987,978 A * | 11/1999 | Whitehead .................... | 73/146 |
| 6,069,966 A | 5/2000 | Jones et al. | |
| 6,321,810 B1 | 11/2001 | Takahira | |
| 6,609,417 B1 * | 8/2003 | Cantu et al. .................... | 73/146 |
| 6,634,223 B2 | 10/2003 | Hartmann et al. | |
| 6,644,122 B2 | 11/2003 | Borowczak et al. | |
| 6,651,495 B2 * | 11/2003 | Lonsdale et al. .............. | 73/146 |
| 6,691,566 B2 | 2/2004 | Iwasaki et al. | |
| 6,789,416 B1 | 9/2004 | Tracy et al. | |
| 6,802,130 B2 | 10/2004 | Podbielski et al. | |
| 6,842,151 B2 * | 1/2005 | Tenten ........................ | 343/711 |

(Continued)

FOREIGN PATENT DOCUMENTS

JP    2004338610 A  *  12/2004

(Continued)

*Primary Examiner*—Lisa M Caputo
*Assistant Examiner*—Jermaine Jenkins
(74) *Attorney, Agent, or Firm*—Roger D. Emerson; Daniel A. Thomson; Emerson Thomson & Bennett, LLC (57) ABSTRACT

A tread depth measurement system for measuring a depth of a tread provided to a tire on a vehicle. The system includes an energy source for emitting a wireless signal to be transmitted to the tire; a sensor for detecting a return wireless signal emitted from the tire to be transmitted in response to the wireless signal from the energy source; and a housing over which the tire is to roll while attached to the vehicle, said housing separating the sensor from the tire while the tread depth is being measured. A control unit is operatively coupled to the sensor for determining the depth of the tread as a function of at least the return wireless signal detected by the sensor.

20 Claims, 9 Drawing Sheets

U.S. PATENT DOCUMENTS

| | | | |
|---|---|---|---|
| 7,114,383 B2 * | 10/2006 | Byrne | 73/146 |
| 7,269,997 B2 * | 9/2007 | Dale et al. | 73/146 |
| 7,295,328 B2 * | 11/2007 | Uehara | 356/601 |
| 7,299,693 B2 * | 11/2007 | Byrne | 73/146 |
| 7,299,694 B2 * | 11/2007 | Byrne | 73/146 |
| 7,398,176 B2 * | 7/2008 | Bertness | 73/146 |
| 7,469,579 B2 * | 12/2008 | Iwase et al. | 73/146 |
| 2002/0088527 A1 * | 7/2002 | Tanaka et al. | 156/95 |
| 2003/0115962 A1 | 6/2003 | Borowczak et al. | |
| 2004/0250613 A1 | 12/2004 | Robert et al. | |
| 2005/0016649 A1 | 1/2005 | Poulbot et al. | |
| 2005/0188757 A1 | 9/2005 | Lin et al. | |
| 2005/0268707 A1 | 12/2005 | Dale, Jr. et al. | |

FOREIGN PATENT DOCUMENTS

| | | |
|---|---|---|
| JP | 2004338620 A * | 12/2004 |
| WO | WO 96/10727 | 4/1996 |

* cited by examiner

TREAD DEPTH SENSING DEVICE AND METHOD FOR MEASURING SAME

BACKGROUND OF THE INVENTION

1. Field of the Invention

The present invention is directed generally to a method and apparatus for sensing the depth of a tire tread, and more particularly, to a noninvasive method and apparatus for measuring a tread depth remaining on a tire while minimizing structural damage to the tire itself.

2. Description of Related Art

New tires are formed with a tread that includes channels through which water, snow and other environmental debris commonly found on roads can pass as the vehicle travels along a public roadway. By allowing the water to enter the channel, the amount of water passing between the roadway surface and an outermost tire surface is minimized, thereby reducing the tendency of the water to lift the vehicle from the roadway surface. Such channels are mandated on all tires to be installed on vehicles that are licensed to travel public roadways, and depending on the type of tire, come in a variety of depths, widths and patterns.

Tread depth is a vertical measurement between the outermost surface of the tire that will actually contact the roadway surface and the bottom surface of the tread's channels that is approximately parallel to the outermost surface of the tire. In the United States, tread depth is measured in increments of $1/32$ of an inch to determine whether the tire is safe for use with a vehicle licensed to navigate public roadways. Traditionally, this measurement has required the partial insertion of a conventional ruler into the channel until a terminal end of the ruler contacts the bottom surface of that channel. The tread depth is then read by an onlooker viewing the ruler's scale extending out of the channel from the plane of the tire's outermost surface.

Measuring the tread depth of a tire with a ruler is difficult and inaccurate. Often the tire with the tread depth being measured is installed on a vehicle that is resting on the ground. Wheel wells, quarter panels and other body parts of the vehicle on which the tire is installed can obstruct the onlooker's view of the ruler, and can often interfere with the insertion of a lengthy ruler into the channel at a location from where it can be easily viewed by the onlooker making the measurement. Further, the fine $1/32$ inch increments of the tread depth measurement and the inconsistent viewing angle of the onlooker onto the ruler from tire to tire often skew the subjective reading of the ruler by the onlooker. Such inaccuracies can result in the erroneous conclusion that a questionable tire is safe to travel along public roadways when, in reality, it is not.

Other devices for measuring tread depth rely less on the subjective reading of a ruler's scale than the use of a ruler does. For example, a tire tread depth gauge includes a single demarcation distinguishing an acceptable tread depth from an unacceptable tread depth. The gauge can be smaller than a ruler, thereby facilitating use of the gauge in cramped spaces where a ruler may not otherwise be useable. Further, the single marking on the gauge simplifies measurements and provides an objective determination as to whether the remaining tread depth of a tire is acceptable for continued use on a vehicle licensed to travel public roadways. One form of such a gauge is a U.S. Lincoln Penny. As a rule of thumb, when the Lincoln Penny is inserted into the channel head first and Lincoln's entire head is visible when observed from a plane of the tire's outermost surface, the tire's tread has been worn to approximately $2/32$ of an inch, and is considered legally worn out in most States.

Although the use of a commercial gauge or simply a Lincoln Penny provides a more objective measurement tool than a ruler, it is still prone to inconsistencies that can lead to erroneous measurements. For example, the onlooker making the measurement may view the extent to which Lincoln's head is visible from a plane other than that which is in the plane of the tire's outermost surface. Thus, the same measurement can vary each time the measurement is performed. And regardless of the objectivity of the measurements made with a gauge or a ruler, measurement of a tire's tread depth with a gauge requires use of the vehicle on which the tire is installed to be discontinued for considerable periods of time for the inspection. Further, keeping records documenting tread wear is time consuming when the tread depth is manually measured with rulers and gauges. Tread wear records for each individual tire in such cases must be manually created and maintained, which also requires each tire to first be manually identified and distinguished from other tires that are to be inspected.

Attempts have been made to automate the measurement of a tire's tread depth. Such devices utilize many laser light sources and sensors positioned in an array to illuminate the outermost surface of the tire's tread, along with side wall profiles. The measurements performed by the array of lasers and sensors encompassed the entire circumference of the tire, and accordingly, required the tire to be removed from the vehicle and rotated by a dedicated stand positioned adjacent to the array of lasers and sensors. Such an arrangement is cumbersome, and makes inspection of tires provided to a fleet of vehicles impractical.

Accordingly, there is a need in the art for an apparatus for accurately and consistently measuring the tread depth of a tire. The apparatus can measure the remaining tread depth of the tire without physically contacting the tire with a measuring device, and can optionally identify and differentiate a plurality of tires from each other in addition to performing the tread depth measurement. Further, the apparatus can optionally measure the depth of a plurality of channels across a width of the tire's tread, and can optionally generate, maintain and update tire wear records automatically, without human intervention.

BRIEF SUMMARY OF THE INVENTION

According to one aspect, the present invention provides a tread depth measurement system for measuring a depth of a tread provided to a tire on a vehicle. The system includes an energy source for emitting a wireless signal to be transmitted to the tire and a sensor for detecting a return wireless signal emitted from the tire to be transmitted in response to the wireless signal from the energy source. The tire rolls over a housing while the tire is attached to the vehicle, the housing separating the sensor from the tire while the tread depth is being measured. A control unit is operatively coupled to the sensor for determining the depth of the tread as a function of at least the return wireless signal detected by the sensor.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 1:
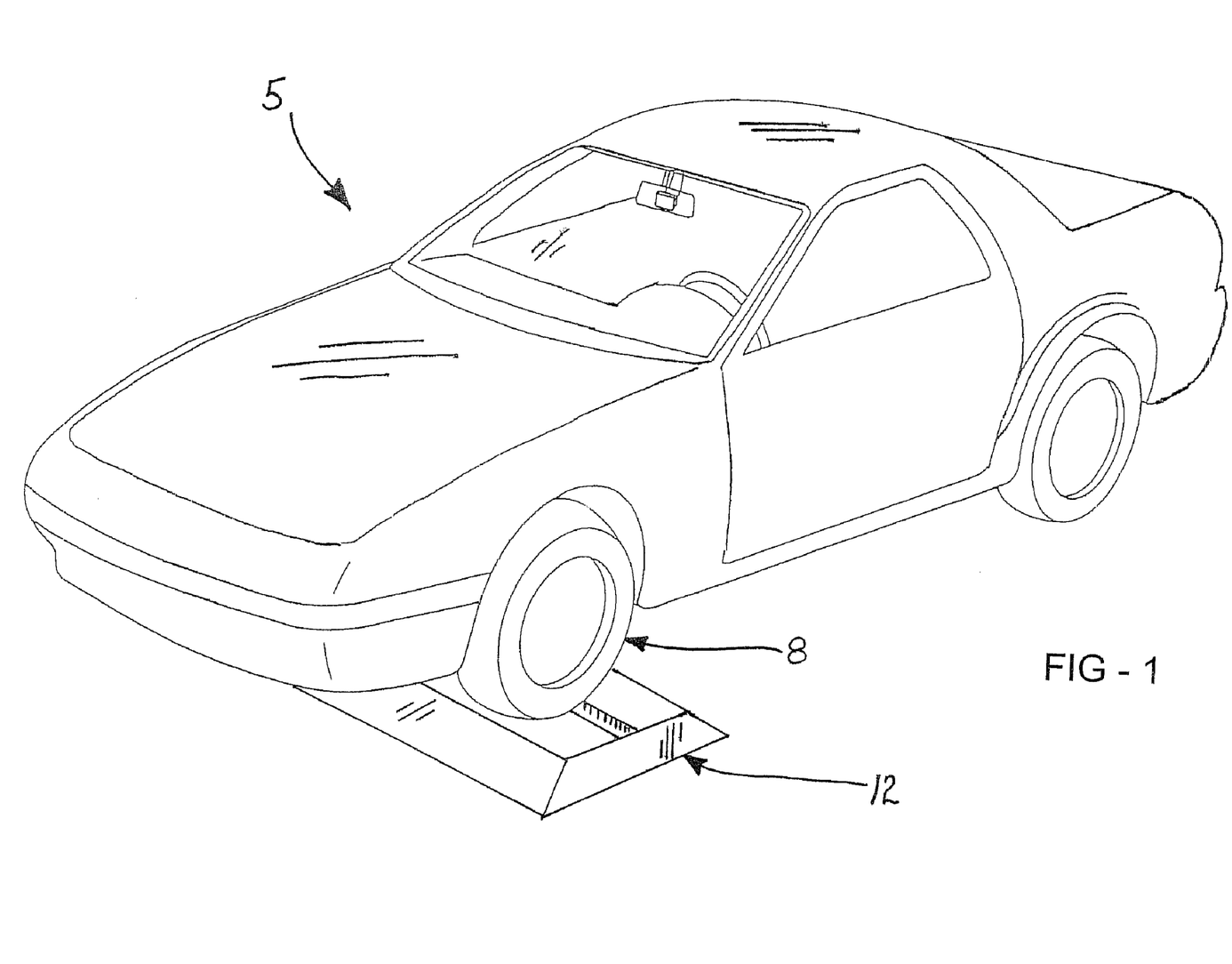
FIG. 1 is a perspective view of an vehicle with at least one tire passing over a housing while having a tread depth measurement of the tire measured.

FIG. 1 shows an illustrative embodiment of a motor vehicle 5 having the tread depth of its tires 8 measured by a tread depth measurement system in accordance with an aspect of the present invention. Although an automobile is shown in the embodiment illustrated in FIG. 1, the present invention is also useful for measuring the tread depth of trucks, buses and the like. The tread depth of the one or more tires 8 being inspected is to be measured according to the present invention while the tire is operatively secured to the vehicle 5. Thus the vehicle 5 can be driven so that the one or more tires 8 can be steered over a stationary housing 12 that separates the tire(s) 8 from one or an array of sensors provided to the tread depth measurement system, and tread depth can be measured without requiring significant interruption of the vehicle's operation.

Figure 2:
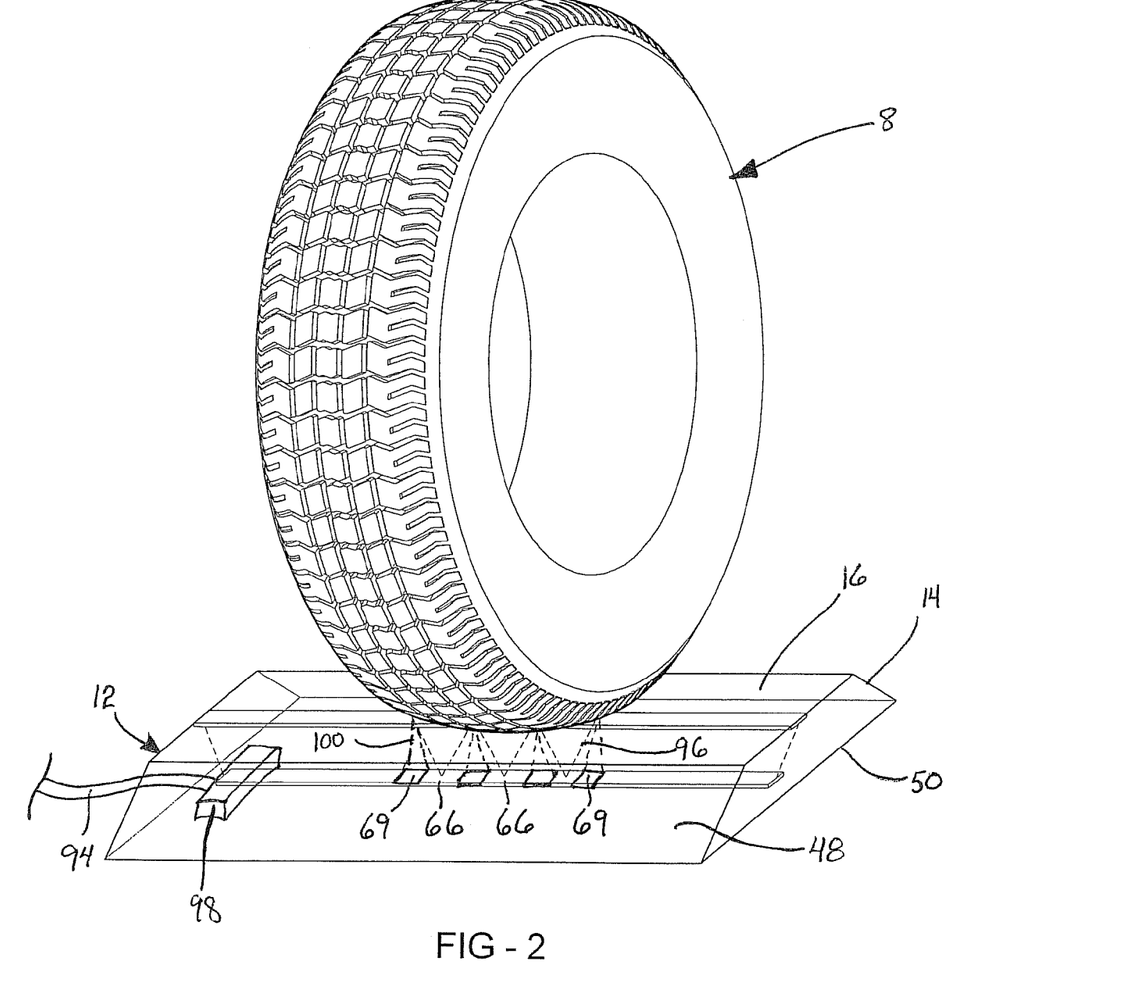
FIG. 2 is a perspective view of a tire supported by a housing of the present invention while a tread depth measurement is being performed according to an embodiment of the present invention.

FIG. 2 shows an isolated view of one tire 8 provided to the vehicle 5 in FIG. 1, as the tire 8 rolls over the stationary housing 12 separating the tire 8 from the sensor(s) for measuring the tread depth according to the present invention. The housing 12 in FIG. 2 is formed as a portable block having an approximately trapezoidal cross-sectional shape. The exterior of the housing includes an inclined portion 14 and a declined portion 48 separated by a substantially horizontal platform portion 16. A base 50 extends between the lowermost points of the inclined and declined portions 14, 48 and provides the housing 12 with stability during tread depth measurement operations described below. The inclined portion 14 and the declined portion 16 are arranged at approximately the same angle relative to the platform 16, and provide the tire 8 with a path along which it can roll to reach the platform 16. Tread depth is to be measured while the tire 8 is located, at least momentarily, atop the platform 16. Alternate embodiments include a subterranean housing 12 at least partially buried within a trench such that the platform 16 is substantially flush with the surrounding surface of the terrain. According to such embodiments, since the platform 16 is flush with the surrounding terrain, inclined planes 14, 48 could be eliminated.

Figure 3:
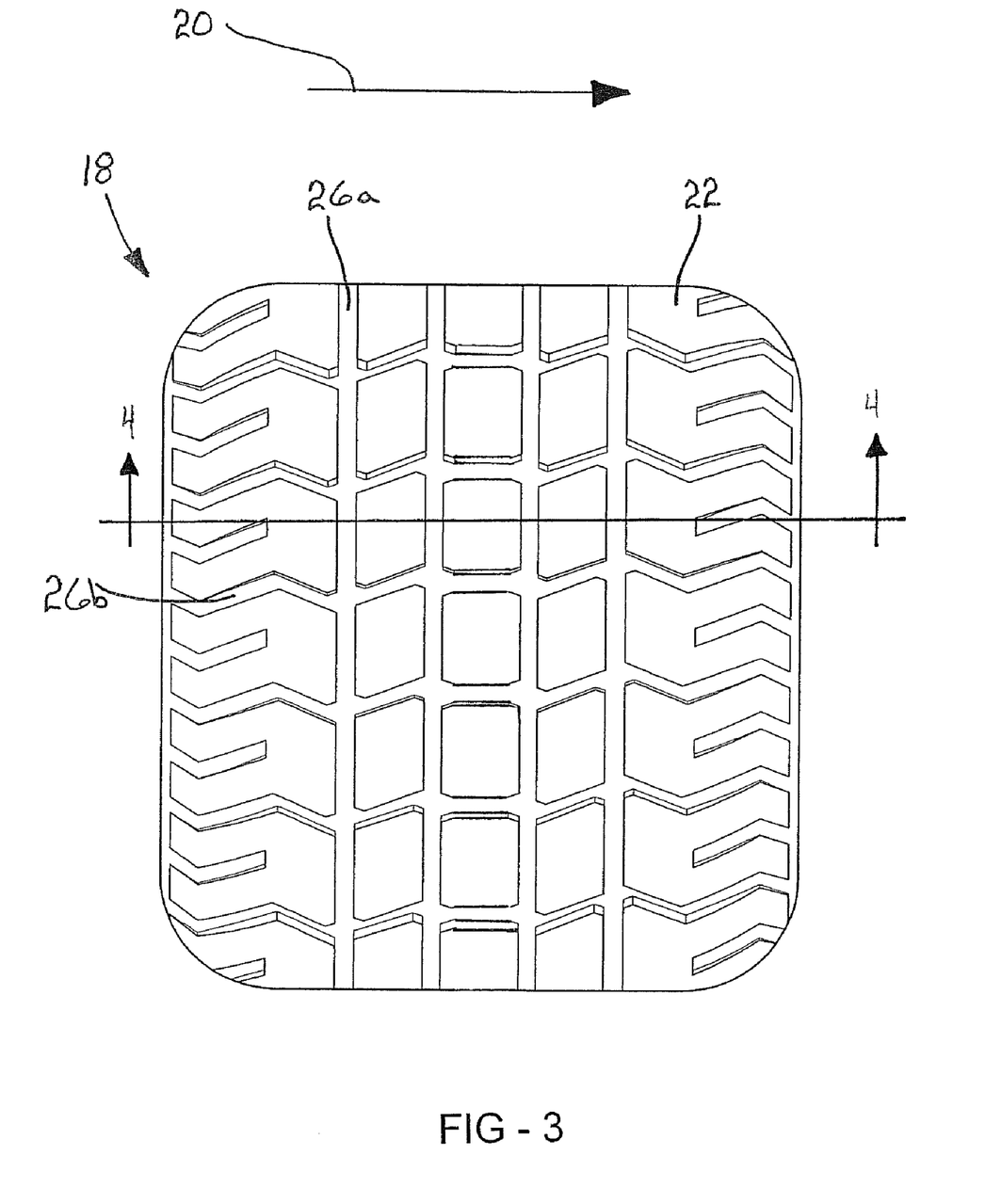
FIG. 3 is a bottom view of a footprint of a tire.

The vehicle 5 with the tire 8 having a tread depth to be measured is driven such that the tire 8 rolls tip the inclined portion 14 to the platform 16. As the tire 8 reaches the platform 16 the tire 8 elastically deforms to form what is commonly referred to as a footprint 18 of the tire 8 on the platform 16 as shown in FIG. 3. FIG. 3 is a view looking up at the footprint 18 of the tire 8 from the viewpoint of the platform 16. With the tire 18 atop the platform 16, at least a portion of the tire's footprint 18 on the platform 16 appears stationary relative to the platform 16, even if only from a brief moment such as when the vehicle 5 is driven slowly over the housing 12 without stopping.

Figure 4:
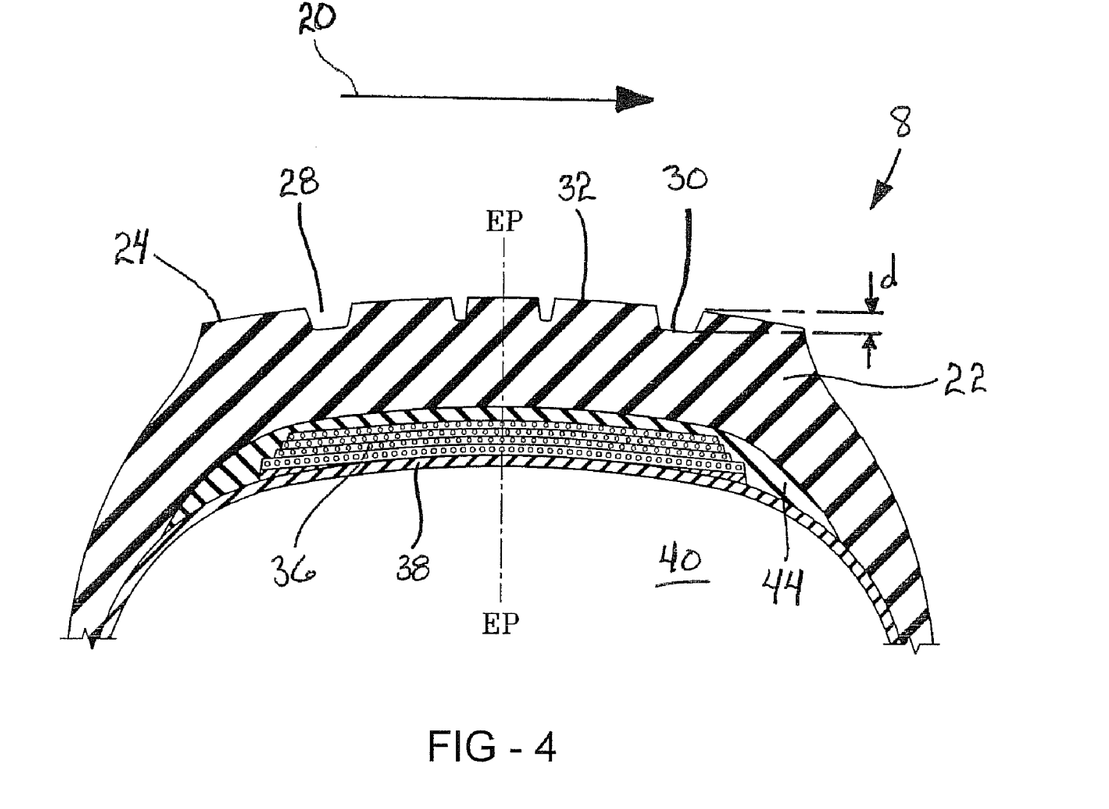
FIG. 4 is a cross sectional view of a tire's footprint taken along line 4-4 in FIG. 3.

The tread depth d of a tire 8 measured according to the present invention is best understood with reference to FIG. 4, which is a cross-sectional view of the tire 8 with the footprint 18 shown in FIG. 3. The tread 22 of the tire 8 is an extruded rubber composition that is cut to a desired length to form the outermost surface 24 of the tire 8. This outermost surface 24 is the surface of the tire 8 that physically contacts the roadway on which the vehicle 5 is driven. A network of channels 26a, 26b, shown best in FIG. 3, are formed in the tread 22 for directing water, snow, mud and other environmental debris out from between the tire and the underlying roadway on which the tire 8 is rolling to minimize separation of the tire's outermost surface 24 from the roadway. Thus, when viewing a cross-sectional illustration of a tire 8 as shown in FIG. 4, the circumferentially-extending channels 26a appear as a series of recesses 28 spaced apart across the width of the tire's tread 22. Tread depth d, as used herein, is the vertical distance d extending in the radial direction outward from the axis about which the tire rotates between an inward surface 30 at the bottom of each recess 28 and an outward surface 32 immediately adjacent to that respective recess 28. In other words, the tread depth d is the elevation change between the outward surface 32 adjacent to a recess 28 and the inward surface forming the bottom of that same recess 28 as shown in FIG. 4.

It is worth noting that the although the outward and inward surfaces 32, 30 of each recess 28 shown in FIG. 4 is a substantially planar surface, these surfaces 32, 30 can be somewhat arcuate. The arcuate shape of either or both of the inward and outward surfaces 30, 32 can be due to deformation of the tire 8 under the weight of the vehicle 5 to which the tire 8 is operatively coupled, due to a design of the tire 8, or due any other such cause. In such instances, the tread depth d can possibly vary across the width of each recess 28 in a direction that is approximately transverse to the circumference of the tire 8 as indicated by arrow 20 in FIGS. 2 and 3. The tread depth d can be determined to be the average of tread depth d measurements taken at a plurality of locations across the width of each recess 28, the tread depth taken at a midpoint or other location of each recess 28, and the like.

Disposed beneath (i.e., radially inward of) the tread 22 in FIG. 4 is one or more layers of steel belts 36 that are made from steel, a steel alloy, or other suitable electrically-conductive material to reinforce the area under the tread 22. These belts 36 provide puncture resistance and help the footprint 18 maintain its substantially planar shape to maximize the surface area of the tire 8 that makes contact with the surface of the roadway on which the tire 8 is rolling for enhanced traction. The tread 22 and an inner liner 38 form an enclosure in which the belts 36 are disposed, along with additional plies of rubberized material 44 that at least partially encapsulates the belts 36. The inner liner 38 also defines an interior cavity 40 that holds air under pressure to inflate the tire 8.

Referring once again to FIG. 2, an illustrative view of a tire 8 provided to the vehicle 5 as the tire reaches the platform 16 is shown. Although the vehicle 5 is not shown in FIG. 2 for the sake of clearly illustrating the interaction between the tire 8 and the housing 12, it is understood that the tire 8 in FIG. 2 is operatively coupled to such a vehicle 5 as described above, permitting measurement of the tire's tread depth d without requiring removal of the tire from the vehicle 5 or significant interruption of the vehicle's operation. The tire 8 rolls as the vehicle 5 is operated by the driver to climb the inclined portion 14 of the housing 12 and rest briefly atop a substantially-horizontal platform portion 16, from where the tread depth of the tire 8 can be measured by the tread depth measurement system of the present invention.

Although the tire 8 is said to rest briefly atop the platform portion 16, the tire 8 does not necessarily have to come to a complete stop. Instead, the normally rotund portion of the tire 8 that makes contact with the platform portion 16 temporarily flattens to form the tire's footprint 18, which is shown in FIG. 3. A portion of the footprint 18 appears substantially stationary when viewed from the perspective of the platform 16 of the housing 12, even if the tire 8 is slowly rotating as the vehicle 5 is advancing. Thus, references herein to the tire 8 resting briefly over the housing 12 are to be construed as the temporary formation of the footprint 18 over the housing 12, regardless of whether the tire's rotation has completely stopped or the tire 8 is slowly rotating. The brief resting of the tire 8 above the housing 12 is long enough to allow for the measurement of the tread depth d of the tire 8 in a widthwise direction indicated by the arrow 20 at least partially across the tire's footprint 18.

Figure 6A:
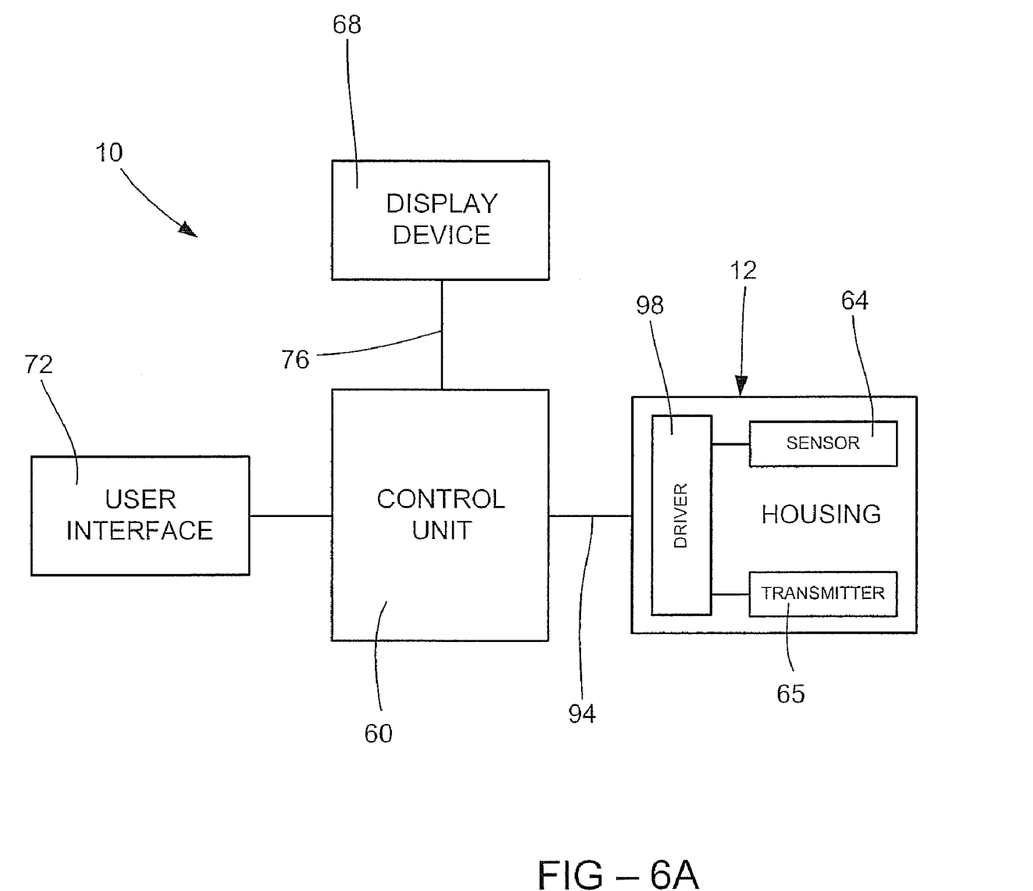
FIG. 6A is a schematic representation of a tread depth measurement system according to the present invention.

An embodiment of a depth measurement system 10 for measuring a tread depth d of a tire 8 operative coupled to a vehicle 5 is schematically illustrated in FIG. 6A. As shown, the depth measurement system 10 includes a control unit 60 and the housing 12 that separates the tire 8 from the one or more sensors 64 while the tread depth d is being measured. Alternate embodiments can optionally also include a display device 68, a user interface 72, or both a display device 68 and a user interface 72.

Figure 6B:
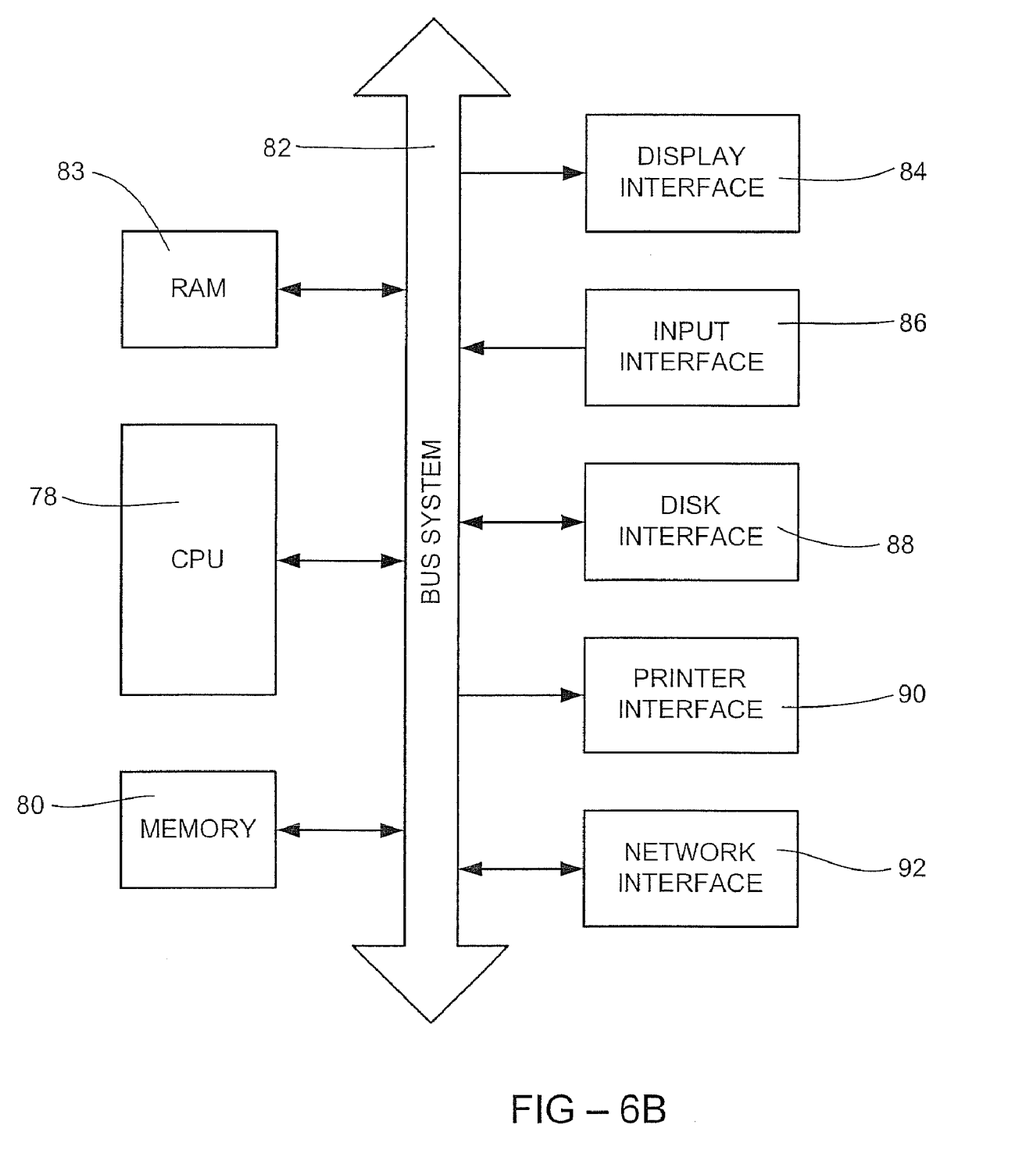
FIG. 6B is a schematic representation of a control unit according to an embodiment of the present invention.

The control unit 60 is depicted schematically in FIG. 6B and includes components that are common to most conventional computer systems. A circuit board (not shown) supports and facilitates communication between circuit components that collectively work together to digitally process information and communicate that information internally to other features of the control unit 60 or externally to peripheral devices via input/output devices. A central processing unit ("CPU") 78 executes computer-readable instructions to perform various operations, including controlling operation of other components of the control unit 60. The computer-readable instructions are stored on a computer-accessible memory 80 provided to the control unit 60 and are communicated to the CPU 78 by a bus system 82.

Data and information being processed by the CPU 78 can be temporarily stored in a volatile memory commonly referred to as random access memory ("RAM") 83 to minimize operations to retrieve and store said data and information in the computer-accessible memory 80. It is typically faster to temporarily store and retrieve data and information required by the CPU 78 to carry out a digital processing operation in the RAM 83 rather than the computer-accessible memory 80 or external memory device. As its name suggests, data and information can be written to, and retrieved from the RAM 83 in any order, not just sequentially like many other forms of computer-accessible memory. Data and information can be communicated to and from the bidirectional RAM 83 via the bus system 82.

The computer-accessible memory 80 can be a volatile or non-volatile memory device capable of storing information and data on a magnetic, capacitive, optical, or other type of computer-readable medium, or any combination thereof. Examples of a suitable computer-accessible memory 80 include a hard disk drive, complementary metal oxide semiconductor ("CMOS") memory, DVD-ROM, CD-ROM, flash drive, and the like. The hard disk drive is a non-volatile computer-accessible memory that can be written to and read from. It includes a set of metal disks with a magnetic recording surface, read/write heads, motors and control hardware that cooperate to store and retrieve data. The hard disk drive can optionally store user data, test data, operating system, application files, or any combination thereof.

According to an embodiment of the present invention, the computer-accessible memory 80 includes an internal hard disk drive for storing computer-readable instructions governing execution of the tread-depth measurements described in detail below. A CMOS memory is also provided according to this embodiment for storing basic input/output ("BIOS") settings that govern the functioning and cooperation of the various components of the control unit 60. The CMOS memory is a form of non-volatile memory, meaning that its contents are not lost when the control unit 60 is turned off. It is powered by an on board power supply such as a battery even when the control unit 60 is not in operation such that the various components of the control unit 60 properly cooperate when the control unit 60 is activated. Among other computer-readable instructions, the CMOS memory includes computer-readable instructions to conduct a check to determine whether the control unit 60 is functioning properly, and to optionally load an operating system when the control unit 60 is activated.

The bus system 82 provides a multidirectional communication pathway interconnecting various components of the control unit 60 for communicating information and data between two or more of those components. The bus 82 can facilitate communication between components of the control unit, and optionally external peripherals of the control unit 60, via parallel communication, serial communication, or both serial and parallel communication protocols.

A display device 68 can be operatively connected to the control unit 60 by a display interface 84 in communication with the bus system 82. Data and information communicated to the display interface 84 over the bus system 82 is translated by the display interface 84 into a suitable format to be displayed to the operator with the display device 68. The display device 68 can be any display unit that can visually convey information about the tread depth d of a tire 8 measured by the depth measurement system 10. Examples of suitable display devices 68 include, but are not limited to touch panel displays, cathode ray tube ("CRT") displays, and the like. During, or shortly thereafter, the display device 68 can display to an operator a profile view of the tread 22 having the depth being measured by the depth measurement system 10. Alternate embodiments display alpha-numeric information about the tire 8 having its tread depth d measured, such as measured tread depth d, percentage of original tread depth d that remains on the tire 8, percentage of tread depth d worn from the tire 8, estimated useful life remaining for the tire 8, any other information or any combination thereof. The display device 68 is operatively coupled to the control unit 60 via a communication channel 76, which can be a fiber-optic cable, electrically conductive cable, wireless communication link, and the like.

Similarly, an input interface 86 is provided to the control unit 60 to establish a communication pathway between the bus system 82 and a keyboard, mouse, other user input device, or any combination thereof. The input interface 86 allows communication of any input commands from the operator to be introduced to the control unit 60 to bring about a desired operation. The operator can also optionally manually enter information regarding the vehicle 5 having the tread depth d of one or more of its tires 8 measured, the make and model of tire 8, and any other information that can be considered in tread depth d measurement via the input interface 86.

The control unit 60 can also optionally include other peripheral interfaces such as a disk interface 88, a printer interface 90 and a network interface 92, each of which are in electrical communication with the bus system 82. The disk interface 88 allows for the communication of data, information, computer-readable instructions, and any combination thereof between an external computer-readable medium and the control unit 60. For example, the disk interface 88 can be operatively connected to communicate with an optical disc drive (not shown) that can accept a CD, DVD, or both a CD and a DVD (collectively referred to as an optical disc). Data, information, computer-readable instructions, or any combination thereof can be transmitted from the computer-accessible memory 80 to the optical disc, and vice versa. Other examples of external computer-readable media include a USB flash drive, floppy disk, external hard drive, and the like.

Similarly, the printer interface 90 allows a printer to be operatively coupled to the control unit 60 for producing hardcopy printouts of data and information gathered during measurement of a tire's tread depth d. The printer (not shown), such as a conventional inkjet or laser printer, can be an external peripheral removably coupled to the control unit 60, or internally disposed within the control unit 60.

The network interface 92 can include a wireless antenna compatible with any of the IEEE 802.11 protocols, an RJ-45 Ethernet port, any other suitable network communication feature, or any combination thereof. The network interface 92 allows data, information and computer-readable instructions to be communicated to and from the control unit 60 over a network. The network can be a local area network of tread depth measurement systems 10 for measuring tread depth d of one or more tires 8 provided to a fleet of vehicles 5, a wide area network of remotely-located storage units commonly referred to as servers, and the like.

According to one embodiment, the control unit 60 includes the CPU 78, bus system 82, computer-accessible memory 80, RAM 83, display interface 84 and network interface 92 all integrally formed as a single entity. This single entity also optionally includes a touch screen display device 68 integrally formed as a portion thereof allowing the operator to manually enter commands to the control unit 60 by touching one or more soft keys displayed by the display device 68. Soft keys are computer generated images identifying locations on the display device 68 the operator can contact to enter a predetermined command associated with each soft key. The single entity can also optionally include any one or more of the input interface 86, disk interface 88, printer interface 90 and network interface 92 also integrally formed as a portion thereof. The single entity of integrally formed components is referred to herein as an industrial panel PC. Other examples of suitable control units 60 include a programmable logic controller that controls movement of the carriage 160, or operation of the electrical signals.

The housing 12 at least partially encloses an energy source 65 for emitting a wireless signal to be transmitted through free space to the tire 8. A sensor 64 is also at least partially enclosed within the housing 12 for detecting a return wireless signal emitted from the tire 8 in response to the interaction of the wireless signal emitted from the energy source 65 with the tire 8. Based at least in part on the return wireless signal sensed by the one or more sensors 64 the tread depth d can be measured without physically contacting the tire 8 with a calibrated ruler and while the tire 8 remains operatively coupled to vehicle 5. The housing is made from a suitably durable material such as a reinforced plastic that can support the weight of the vehicle 5 that is imparted thereon by the tire 8 as the tire 8 rolls over the housing 12. Further, the housing 12 is operatively coupled to the control unit 61 via a communication link 94, which can be a hardwired connection established with an electrical or optical conductor, or a wireless communication link established according to a Bluetooth® or IEEE 802.11 protocol for example. The communication link 94 conducts data, information and control signals between the control unit 60 and the one or more sensors 64 and one or more energy sources 65 disposed within the housing 12.

FIG. 2 illustrates an embodiment of a transmitter 65 and sensor 64 arrangement according to an illustrative embodiment of the present invention. As shown, the transmitter 65 is in the form of an eddy current source 66 through which alternating current from a driver 98, which in the embodiment shown in FIG. 2 is a power supply controlled by the control unit 60, is conducted to emit a wireless signal in the form of a dynamic magnetic field 96. The tire 8 passes through this dynamic magnetic field as it travels across the platform portion 16 of the housing 12. This magnetic field 96 induces an eddy current in one or more of the belts 36 of the tire 8 while the tire 8 is in the magnetic field. The induced eddy current in the belt(s) 36 generates a return wireless signal in the form of an induced magnetic field 100 that is sensed by the one or more sensors 64, which are magnetic field sensors 69 according to this illustrative embodiment, to determine the tread depth d of that particular tire 8.

Figure 7:
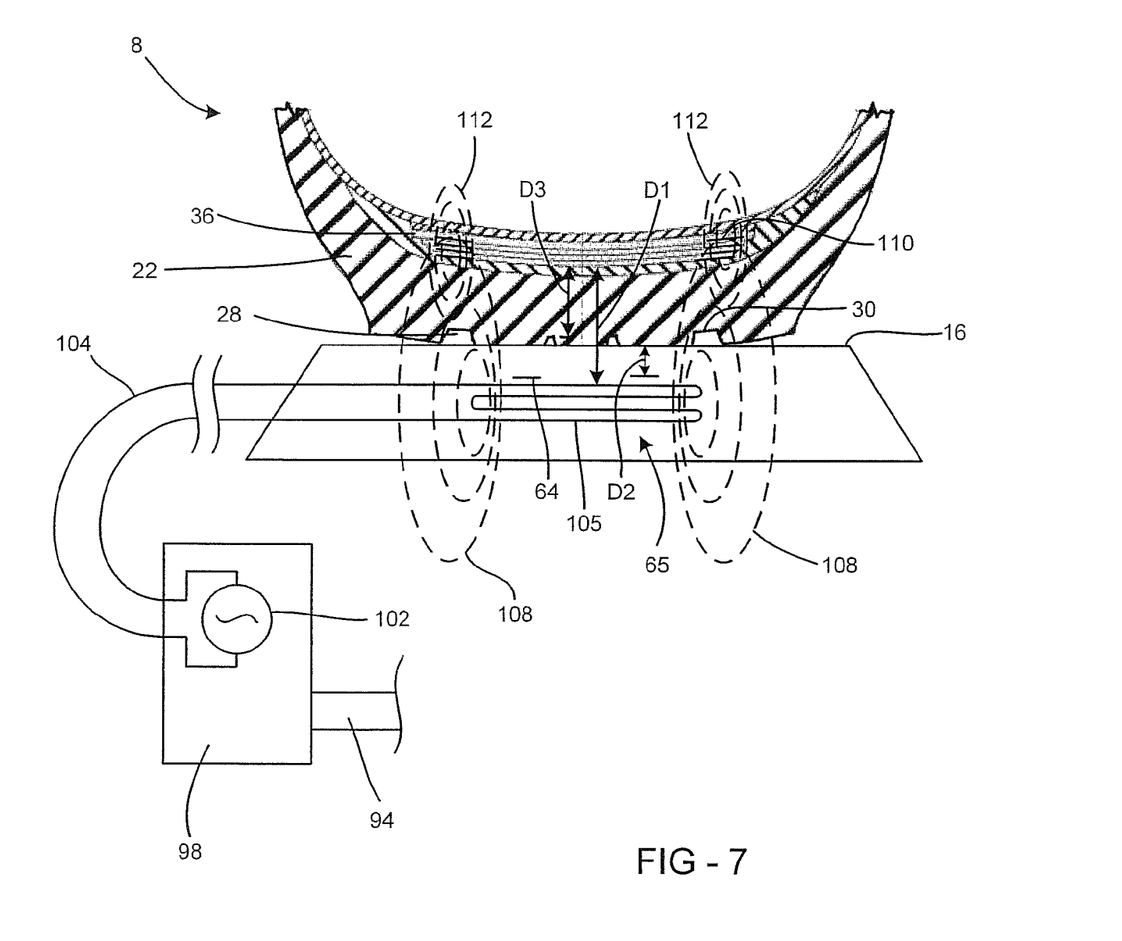
FIG. 7 is a partially cutaway view of a tire having its tread depth measured in accordance with an embodiment of the present invention.

A detailed description of the tread depth d measurement using an eddy current source as the energy source 66 is best understood with reference to FIG. 7. In FIG. 7, the tire 8 is resting on the platform portion 16 of the housing 12. Alternating current is conducted through an electrical conductor 104 of the energy source 66 from an AC source 102 provided to the power supply 98 controlled by the control unit 60 through communication link 94. The conductor 104 can be formed into a coil 105 at a location where the wireless signal 96 is to be emitted generally toward the tire 8. The alternating current generates a dynamic magnetic field 108 that expands as the alternating current in the conductor 104 rises to its peak magnitude and contracts as the alternating current returns to the zero crossing. This dynamic magnetic field 108 passes through the rubberized and dielectric material of the tire 8 without being significantly modulated and induces eddy currents 110 in the belts 36. Eddy currents 110 are induced electrical currents that follow a circular conductive path in the plane of the belts 36 in FIG. 7. These eddy currents 110 generate a return wireless signal in the form of their own magnetic field 112 that opposes the dynamic magnetic field 108 generated by the alternating current flowing through the conductor 104. It is the magnitude of this opposing magnetic field 112 that is sensed by the one or more sensors 69 to determine the distance separating the belts 36 of the tire 8 from the conductor 104.

Each tire 8 rolled over the platform portion 16 of the housing 12 can be identified manually by the operator with the input interface 86, touch screen display device 68, and the like; or automatically as described in detail below. Each make and model of tire 8 can have a known distance separating the belts 36 from the inward surface 30 of the recesses 28 of the tire's tread 22, this distance being referred to below as D1. Thus, if the tire 8 is identified the distance D1 between the belts 36 and the inward surface of the recesses is known.

The distance between the exposed surface of the platform portion 16 of the housing 12 on which the tire 8 rolls and the conductor 104 is also known, and will be referred to as D2. Further, the distance separating the belts 36 from the conductor 104 is determined based on the magnitude of the magnetic field 112 generated by the eddy currents 110 sensed by the sensors 69, and will be referred to as D1. Then the tread depth d of the identified tire 8 can be determined by subtracting the distance D2 between the platform portion 16 and the conductor 104 and the distance D3 between the belts 36 and the inward surface 30 of the recess 28 from the measured distance D1 between the belts 36 and the conductor 104. In other words, tread depth d can be calculated according to the following formula:

$$d = D1 - D2 - D3$$

Figure 5:
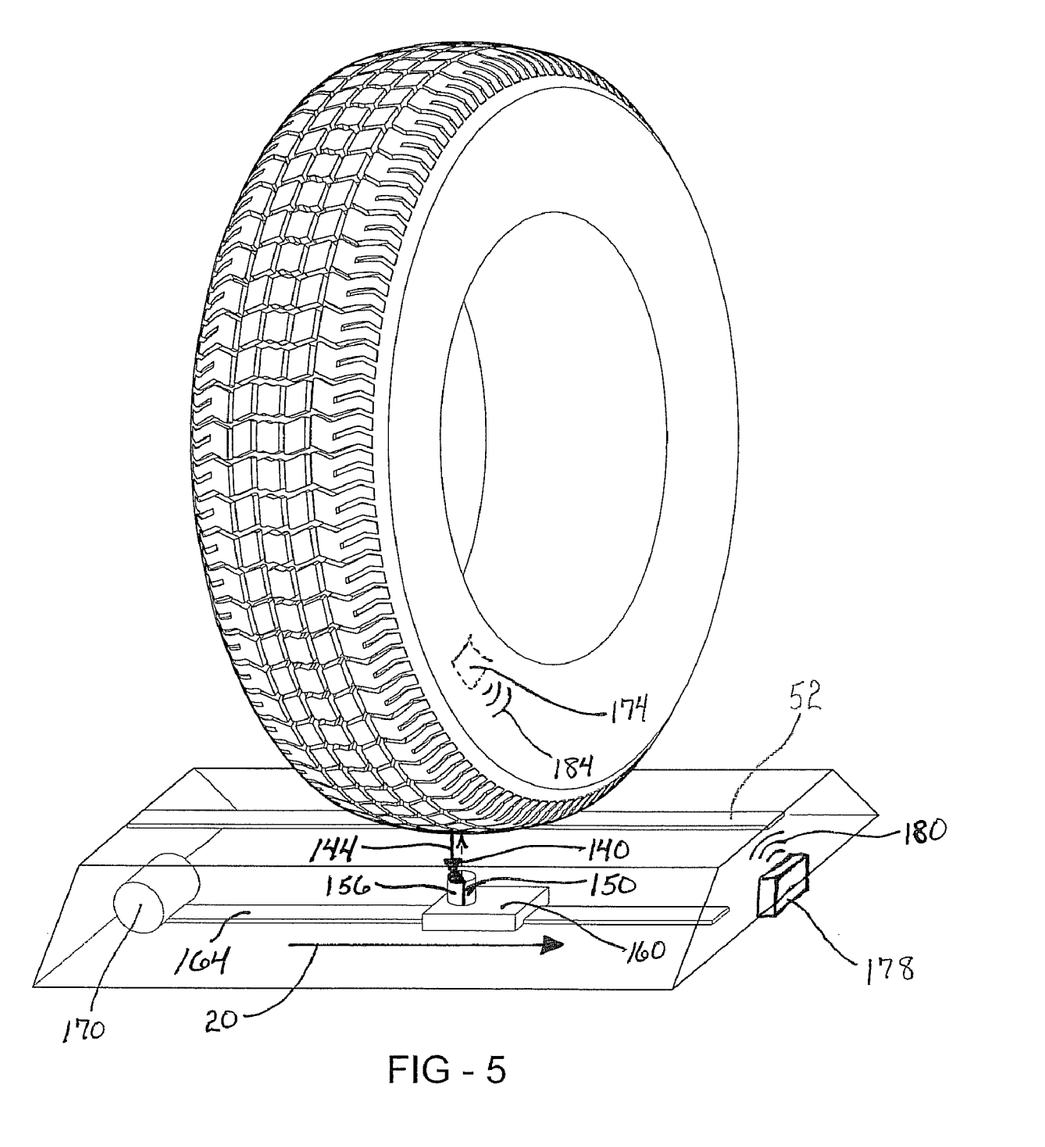
FIG. 5 is a perspective view of a tire supported by a housing of the present invention while a tread depth measurement is being performed according to an embodiment of the present invention.

FIG. 5 shows another illustrative embodiment of the use of a wireless signal 140 and a return wireless signal 144 to measure the tread depth d of a tire 8. According to this illustrative embodiment the wireless signal 140 is in the form of a focused light emission such as a laser light, for example. Like the magnetic fields 108 discussed above, the light emitted as the wireless signal 140 can be used to measure tread depth d without physically comparing the tread depth with a calibrated instrument such as a ruler.

The transmitter 65 (FIG. 6A), in the form of a light source 150 according to this illustrative embodiment, is paired with a sensor 64 (FIG. 6A) in the form of a light sensitive sensor 156 to sense light from the light source 150 that is reflected by the outermost surface 24 of the tire 8. Both the light source 150 and the sensor 156 are coupled to a carriage 160 that is operatively mounted to travel along a track 164. The track 164 carrying the carriage 160 is disposed within the housing 12 and is oriented to span along the width of the housing 12 in the transverse direction relative to the tire 8, which is the direction indicated by the arrow 20. A scan of the tire's tread 22 topography can be made as the carriage 160 travels in the transverse direction 20 while the tire 8 is atop the platform portion 16 of the housing 12. The light 140 and reflected light 144 travels between the light source 150/sensor 156 and the tire 8 through an elongated aperture 52 formed in the platform portion 16 of the housing 12 that is substantially parallel to the track 164.

A driver 170 is operatively coupled to the carriage 160 to urge the carriage 160 along the track 164 to illuminate a swatch spanning the width of the footprint 18 of the tire 8 during scanning operations. The driver 170 can include an electric motor that drives a belt for urging the carriage 160 along the track 164, an air motor that supplies pressurized air to urge the carriage 160 along the track 164, or any other suitable prime mover for urging the carriage along the track 164. Electric energy required to energize the light source 150 and the sensor 156 during scanning operations along with commands governing said scanning operations can each independently be communicated to the light source 150 and sensor 156 by: one or more electrical conductors forming a wire harness, by one or more electrical conductors that extend along the track 164 to communicate with the carriage 160 while the carriage 160 travels along the track, and the like.

Figure 8:
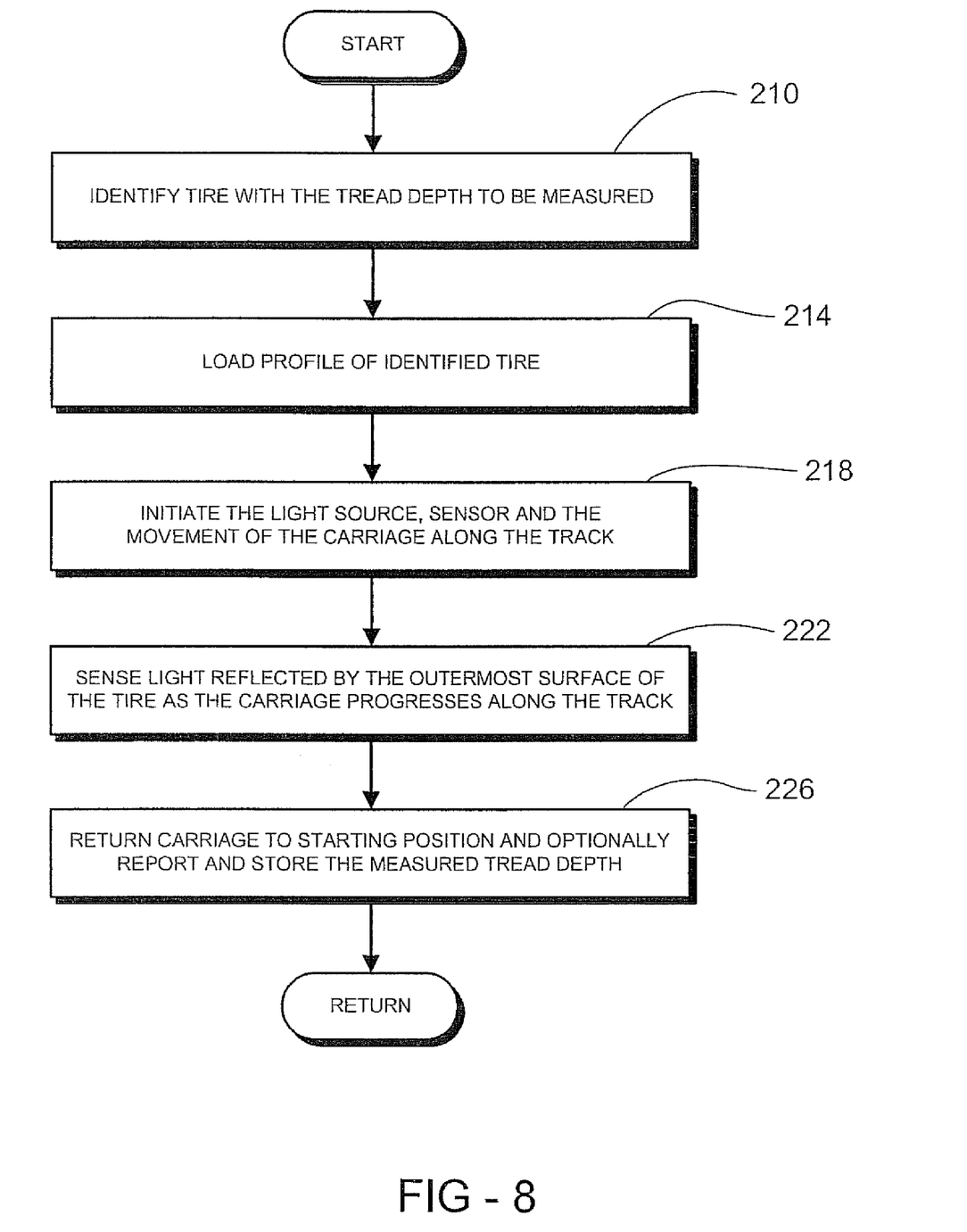
FIG. 8 is flow diagram illustrating an embodiment of a method of measuring a tread depth of a tire in accordance with an embodiment of the present invention.

The tread depth d can be measured utilizing reflected light as illustrated in the flow diagram of FIG. 8. Initially, the tire 8 with the tread depth d to be measured is identified at step 210, either manually or automatically. Again, due to the identification of the tires 8 having their tread depth d measured the wear rate, remaining useful life, and the like can be monitored to minimize unexpected interruptions of a vehicle's operation due to a problem with the tire 8.

The step of identifying the tire 8 was also mentioned above with regard to the embodiment utilizing an induced magnetic field to measure a tire's tread depth d. Automatic identification of a tire 8 can be accomplished through the use of a wireless identification signal emitted from a transmitter 174 (FIG. 5) provided to the tire 8. For example, the transmitter 174 can be a radio frequency identification ("RFID") tag embedded within the tire 8. An embodiment of the RFID tag 174 is a passive device that includes a coiled electrical conductor and an optional small memory storing an identification string. A transceiver 178 provided to the housing 12 and in communication with the control unit 60 emits what is commonly referred to as an interrogation signal 180, which is a radio frequency ("RF") wireless signal. The interrogation signal 180 induces a small electric current in the conductor of the RFID tag 174 that is sufficient to briefly energize a CMOS integrated circuit provided to the RFID tag 174, causing the RFID tag 174 to emit a responsive signal 184 to be received by the transceiver 178. The responsive signal 184 emitted by each RFID tag 174 provided to different tires 8 emits a unique responsive signal that identifies and distinguishes each different tire 8 from the others. Thus, the tread depth measurement system 10 can automatically identify each tire 8 as the tire 8 approaches the housing 12 by inducing and detecting the responsive signal 184 from the transmitter 174 of the tire 8 without intervention by an operator.

The method continues to step 214 where the profile of the identified tire 8 stored in the computer-accessible memory 80 of the control unit 60 is loaded. The tire profile includes information identifying the expected location of the channels 26a along the width of the tire's footprint 18. The loaded profile allows the system 10 to recognize the pattern of the tire's tread 22 being illuminated by the light source 150.

The carriage 160 is urged along the track 164 by the driver 170 and the light source 150 and sensor 156 are activated at step 218. As the carriage 160 travels along the track 164 the light source 150 illuminates the swatch across the width of the tire's footprint 18 with light 140. Light 144 reflected by the outermost surface 24 of the tire 8 as the carriage 160 travels along the track 164 is sensed by the sensor 156 at step 222. The time it takes for reflected light 144 to reach the sensor 156 after being emitted by the light source 150, the intensity, the quantity, or any combination thereof can be utilized by the control unit 60 to measure the distance between the sensor 156 and the various surfaces forming the outermost surface 24 of the tire 8, for example. According to another embodiment, the location where the beam of light contacts with the surface 24 of the tire 8 can be determined by measuring the at which the reflected light reaches the sensor 156. Once the scan of the footprint's width is complete, the tread depth d can be determined by the control unit to be: the average tread depth of the recesses 28 formed in the tire's tread 22, the tread depth of the centermost recesses 28 of the tire's tread 22, any other mathematical function of the tread depth d measured for one or more of the recesses 28 formed in the tire's tread, or any combination thereof.

With the scan of the tire's footprint 18 complete, the carriage is returned to its initial position at step 226 and the tread depth d reported to the operator, stored in the computer-accessible memory 80, or both. According to other embodiments, the carriage can remain its position following a scan, and return while making a measurement traveling in the return direction for another tire.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A tread depth measurement system for measuring a depth of a tread provided to a tire on a vehicle, the system comprising:
   an energy source for emitting a wireless signal to be transmitted to the tire;
   a sensor for detecting a return wireless signal emitted from the tire to be transmitted in response to the wireless signal from the energy source;
   a housing over which the tire is to roll while attached to the vehicle, said housing maintaining a separation between the tire and the sensor to prevent the tire from making direct physical contact with the sensor while the tread depth is being measured; and
   a control unit operatively coupled to the sensor for determining the depth of the tread as a function of at least the return wireless signal detected by the sensor.

2. The tread depth measurement system according to claim 1, wherein the energy source is an electrical conductor that emits a magnetic field as the wireless signal when subjected to alternating current to induce an eddy current in a belt provided to the tire.

3. The tread depth measurement system according to claim 2, wherein the return wireless signal is a magnetic field generated by the eddy current induced in the belt of the tire.

4. The tread depth measurement system according to claim 3, wherein the sensor detects a magnitude of the magnetic field generated by the eddy current induced in the belt of the tire and the depth of the tread is determined by the control unit as a function of at least the magnitude detected by the sensor.

5. The tread depth measurement system according to claim 1, wherein the energy source includes a laser that illuminates an outermost surface of the tire with laser light.

6. The tread depth measurement system according to claim 5, wherein the return wireless signal is a portion of the laser light reflected by the outermost surface of the tire.

7. The tread depth measurement system according to claim 6, wherein the sensor detects the portion of the laser light reflected by the outermost surface of the tire and the depth of the tread is determined by the control unit as a function of at least the portion of the laser light detected by the sensor.

8. The tread depth measurement system according to claim 5, wherein the housing comprises an elongated aperture that extends generally transverse to a direction in which the tire rolls over the housing.

9. The tread depth measurement system according to claim 8 further comprising:
   a track that extends generally parallel to the elongated aperture along which the laser can travel; and
   an electric motor for adjusting the position of the laser along the track to illuminate a transverse strip of the tire that extends across at least a portion of the tread's width to measure the depth of a plurality of channels formed in the tread.

10. The tread depth measurement system according to claim 9, wherein the control unit determines whether the tire is suitable for continued use as a function of at least the depth of the plurality of channels.

11. The tread depth measurement system according to claim 8 further comprising:
    a track that extends generally parallel to the elongated aperture along which the laser can travel; and
    a pneumatic actuator for adjusting the position of the laser along the track to illuminate a transverse strip of the tire that extends across at least a portion of the tread's width to measure the depth of a plurality of channels formed in the tread.

12. The tread depth measurement system according to claim 11, wherein the control unit determines whether the tire is suitable for continued use as a function of at least the depth of the plurality of channels.

13. The tread depth measurement system according to claim 1 further comprising a wireless signal receiver for detecting a wireless signal that is generated and transmitted from a transmitter provided to the tire to identify at least one tire that is to have its tread depth measured.

14. The tread depth measurement system according to claim 13, wherein the wireless signal receiver is a RE receiver for detecting a RF wireless signal that is generated and emitted by a radio-frequency identification tag embedded within the tire that is to have its tread depth measured.

15. The tread depth measurement system according to claim 1 further comprising a temperature sensor for detecting an ambient temperature of the tire to compensate for temperature effects on the tread depth measured by the tread depth measurement system.

16. The tread depth measurement system according to claim 15, wherein the temperature sensor is embedded within the tire that is to have its tread depth measured.

17. The tread depth measurement system according to claim 1 further comprising a pressure sensor provided to the tire that is to have its tread depth measured for detecting an internal pressure of the tire to compensate for pressure effects on the tread depth measured by the tread depth measurement system.

18. The tread depth measurement system according to claim 1 further comprising a computer-accessible memory for storing the tread depth measured by the tread depth measurement system and associating the tread depth with the specific tire that had its tread depth measured.

19. The tread depth measurement system according to claim 1 further comprising a wireless signal receiver for detecting a wireless signal that is generated and transmitted from a transmitter provided to the tire to identify the make and model of at least one tire that is to have its tread depth measured.

20. The tread depth measurement system according to claim 19, wherein the wireless signal receiver is a RF receiver for detecting a RF wireless signal that is generated and emitted by a radio-frequency identification tag embedded within the tire that is to have its tread depth measured.

* * * * *